Patented July 25, 1950

2,516,342

UNITED STATES PATENT OFFICE 2,516,342

INSULATING FINISHING CEMENTS

Merwyn C. Randall, Philadelphia, Pa., and George S. Gethen, Collingswood, N. J.

No Drawing. Application September 11, 1948, Serial No. 48,935

3 Claims. (Cl. 106—92)

This invention relates to an insulating finishing cement and more particularly to insulating finishing cement compositions containing essentially hydraulic cement, fly ash, bentonite, pregelatinized starch and a fibrous material. This invention also relates to processes for making such insulating finishing cement compositions.

Some of the prior art cements, such as the combination of Portland cement and asbestos floats, when mixed with water provide coatings having relatively hard surfaces and are commonly used as finishing cements over insulating materials such as magnesia block. While such cements have been found to give a smooth surface, they have relatively high densities and a high degree of hardness which prevents such cements from being good thermal insulators. Moreover, they have limited coverage, have a very poor water retentivity and high shrinkage and have relatively low adhesion values, particularly when applied to smooth metallic surfaces and the like. A further disadvantage inherent in such compositions is that they have very poor adhesion to a previously applied layer of the same composition. Various other cements containing insulating bodies such as asbestos, wood flour, diatomaceous earth and the like have been proposed but while some of these cements have improved thermal insulating properties they are frequently lumpy or otherwise present irregular, rough surfaces and they do not adhere well to underlying base insulations or to smooth metallic surfaces. Such cements are generally porous and before they can be painted or whitewashed they require a preliminary treatment such as sizing or the application of a finishing cement. In general the insulating cements of the prior art provide excessively rigid structures having poor water retentivity and therefore tend to crack on expansion or contraction. Their use is therefore limited to situations where there is no intimate association with metallic structures such as pipes and tanks which are alternately heated and cooled. Some of the prior art cements crack even when applied to a base of uniform temperature simply because of an excessive tendency to shrink.

It is therefore an object of the present invention to provide a unique composition which acts as a combined insulating and finishing cement. It is a further object of this invention to provide a strong finishing cement of low density having a smooth, nonporous surface and excellent sound absorptive and thermal insulative properties, that does not crack on expansion or contraction and adheres securely to the usual base surfaces, to smooth metallic surfaces, and to previously applied layers of the same composition. Another object is to provide an insulating and finishing cement having good adhesion and good water retentivity that is easily applied on the job by adding water to a dry mix. Still another object is to provide processes for making the novel insulating finishing cements of this invention.

The foregoing and other objects of the present invention are attained by means of a dry mix containing essentially a dry cementitious component comprising a dry hydraulic cement and dry fly ash; a dry binder component containing dry bentonite and a pregelatinized dry starch; and a dry mineral fiber component comprising a fibrous material such as the tufted rock wool hereinafter described. In addition to the principal ingredients referred to above, we may incorporate other materials such as plasticizers and fillers. When the dry mix of this invention is combined with a suitable amount of cold water, a plastic mass of workable consistency is attained. When this plastic mass is applied for insulating a wall, pipe or tank or as a finish coating cement applied over other insulating coatings, it sets to form a novel insulating finishing cement having the unique combination of properties mentioned above. A further unique property of the composition of the present invention is that it does not require the use of reinforcing wire to develop adhesion to the surface being covered, whether this be base insulation material in block or monolithic form or a smooth metallic surface such as a water tank. Heretofore, it has been necessary to apply chicken wire or the like to the surface to be coated in many cases in order to get satisfactory adhesion. Moreover, the composition may be applied by trowel or by the various types of cement guns well known to the art.

The raw materials of the compositions of our invention consist of commercial materials normally available at low cost. The hydraulic cements employed in the practice of the present invention comprise those cements which set under water and include the standard ASTM Portland cement and the high early strength Portland cements. The Portland cement herein referred to is the well-known finely divided product resulting from calcination of an intimate mixture of argillaceous and calcareous materials having the property of setting to a solid mass after mixing with water. The cement may advantageously be combined with other materials such as gypsum and the like which have the property of setting after mixing with water and help to produce an early set. In combination with the dry cement we employ a finely divided dry fly ash. The term "fly ash" as used in the present specification is intended to indicate the finely divided ash residue produced by the combustion of pulverized coal which ash is carried off with the gases exhausted from the furnace in which the coal is burned and which is collected from these gases usually by means of suitable electrical or mechanical precipitators.

The dry bentonite in the compositions of the present invention is customarily designated as a native colloidal clay or as a sodium montmorillonite. It has the property of swelling in the presence of water to a volume several times its original volume. In combination with the dry bentonite a dry pregelatinized starch is used in making up the binder component. The term "pregelatinized starch" as employed throughout the present specification and claims is used to designate a treated starch in dry form derived from a previously formed starch gel and having the property of rapidly absorbing cold water to substantially the full amount of its water deficiency. Pregelatinized starch is normally made by boiling raw starch in water to form a gel paste and drying the paste under carefully controlled temperature conditions. A particularly desirable pregelatinized starch is made by mixing raw starch grains into a dilute acid solution such as hydrochloric acid and water, draining off the excess acid, boiling the starch grains in water to form a thick paste and drying the paste under carefully controlled temperature conditions. The resultant pregelatinized starch in combination with the other elements of the present invention contributes to the unique results obtained in the final product.

While we employ pregelatinized starch in our compositions we believe that there may be other equivalent starches having similar properties rendering them suitable as constituents of compositions of this invention. The basic step involved in making a treated starch that absorbs cold water rapidly seems to be the penetration or rupture of the hard outer hemicellulose layer of the starch grain, and methods such as micronizing in a fluidizing mill or the like may be found to produce a starch substantially equivalent to the pregelatinized starch of this invention.

Another raw material used in the practice of the present invention is a fibrous mineral. While fibrous minerals and mineral wools such as glass wools, slag wools and mineral fibers made by impinging a steam jet against a stream of molten siliceous minerals are excellent for the present purposes, we prefer to use a specific mineral wool commercially available as rock wool which contributes excellent heat insulation, fire resistance and pliability to the final cement, particularly when pre-treated as hereinafter described. More particularly we prefer a specially tufted mineral wool or rock wool manufactured in accordance with our novel tufting process.

While the incorporation of further materials is not a requisite of the present invention, we prefer to add a plasticizer in order to improve the working properties of the insulating finishing cement. We prefer to add small quantities of plasticizers such as trisodium phosphate, the sulfonates or sulfates of long-chain alcohols such as lauryl alcohol or other commercial plasticizers to the inventive combination in order to attain a soft plastic cement paste.

In the preparation of the present inventive compositions the hydraulic cement, fly ash, bentonite, starch and mineral fibers are intimately mixed in a dry state. The blending of the dry, solid ingredients is attained by simple mechanical agitation or by machine blending in an apparatus of the ribbon blender type in which the rotation of a shaft sets a connected ribbon in motion with resultant intimate mixing of the solids contacting the moving ribbon. Other mechanical blenders capable of mixing dry powders and fibers will likewise be found to be workable. After blending, the dry mix may be stored and transported in bags to the situs of application in a manner similar to that of Portland cement. Compositions of the present invention are applied on the job by mixing the dry composition thoroughly with cool water or cold water to a convenient plastic consistency, applying the cement to the base member being coated, and then troweling or otherwise smoothing the outer surface. The plastic mix should preferably be applied within a few hours after adding water because the matrix may otherwise set before application and to some extent impair the final strength of the material.

In preparing the plastic mix by adding water it is essential to have all the solid ingredients of the mixture in the dry state and intimately mixed before any water is incorporated. The cement produced by first forming a starch-bentonite-water slurry and then mixing the slurry thus formed with the cementitious component does not have the unusual properties of the cements of the present invention and we do not intend to include such use of preformed starch slurries or pastes within the scope of the present invention.

An insulating finishing cement having high insulating value and an outstanding ability to expand or contract is made in accordance with this invention by incorporating our specially tufted mineral fibers into the composition. In the preparation of ordinary commercial rock wool the fibers are compressed in a felted state and run through revolving screens to remove dense spherical particles. The rotary motion forms the rock wool fibers into small spherical masses or fibrous balls. When these fibrous balls are used in an insulating cement the balls retain their shape and are not penetrated or filled in by the finely divided components of the mixture. Since some of the fibrous balls are about ½ inch in diameter they impair the smooth, hard property of a finished surface, thus producing the rough surface characteristic of the prior art insulating cements containing rock wool.

In order to preserve the advantageous bulking action of rock wool and obtain a smooth hard surface at the same time we have prepared, as a preferred embodiment of the present invention, a composition which contains our specially tufted rock wool. Tufted rock wool is a loose, fluffy rock wool made by picking the aforementioned fibrous balls in a carding machine or by means of spiked rolls travelling in opposite directions or at different speeds in the same direction. A carding machine of the type employed for carding cotton is satisfactory, after minor adjustments, for making tufted rock wool from rock wool fibrous balls. The fibrous balls are pressed into a mat form between smooth cylindrical rolls and the mat is continuously fed in intimate contact with the surface of the leader roll provided with steel teeth. The leader roll revolves at a speed of about 1000 R. P. M. and its teeth tend to pull the fibrous balls apart with a combing action. The leader roll is continuously in communication with a second cylinder having fine wire teeth. The second cylinder rotates in the same direction as the leader roll but at a greater surface speed. The rock wool is picked up on the second cylinder and a tufted rock wool having an average tuft size of about half that of the original fibrous balls is continuously fed from the second cylinder as the tufted product. When tufted rock wool is mixed with the cementitious ingredients of the insulating finishing cement of this invention the tufts retain enough of their spherical configuration to prevent the surrounding cementitious ingredients from mixing intimately with the rock wool fibers while on the other hand the picking operation fluffs the fibrous balls thereby loosening individual fibers near the surface and affording binding of individual loosened fibers at the surface of the tuft with cementitious ingredients while still preserving the bulking action of the rock wool tufts attributable to their pliable fiber content. Therefore, our insulating finishing cement containing tufted rock wool may be trowelled to a smooth, relatively hard surface and has nevertheless remarkable insulating properties and is capable of expanding and contracting without cracking.

While the specific mineral wool known as rock wool has been used in the foregoing description of our tufting processes, it will be understood that our tufting process is similarly applicable to mineral wools and mineral fibers generally with substantial improvement of the insulating finishing cement containing said tufted mineral wools or mineral fibers.

One of the preferred formulas of our novel insulating finishing cements includes tufted rock wool and fly ash in combination with Portland cement, gypsum, bentonite, pregelatinized starch and a plasticizer in the following proportions:

|  | Parts by wt. | Wt. Per Cent |
|---|---|---|
|  | Pounds |  |
| Fly ash | 560 | 28 |
| Portland cement | 280 | 14 |
| Gypsum | 80 | 4 |
| Tufted Rock Wool | 700 | 35 |
| Bentonite | 170 | 8½ |
| Pregelatinized starch | 150 | 7½ |
| Trisodium phosphate | 40 | 2 |
| Lauryl alcohol sulfate | 20 | 1 |

100 pounds of a dry insulating finishing cement so constituted were mixed with 175 pounds of water to make a cement paste of a suitable plastic consistency and test pieces were formed into shape on magnesia board and allowed to set. The test pieces were then tested in accordance with the procedures set out in U. S. Navy Department Specification 32 C 14d of November 2, 1942. After setting, the insulating finishing cement had an adhesive strength of 9.2 lbs per sq. inch and had a coverage of 42.8 board feet per 100 lbs. of the dry mix. It trowelled to a smooth finish even when applied in a thickness of 1½ inches and had a shrinkage of only 7.3%. The surface hardness was 0.64 mm. Due in part to its low density of 31-42 lbs./cu. ft. the above insulating finishing cement had a low thermal conductivity of 0.7 B. t. u. per hour per square foot per degree Fahrenheit per inch of thickness.

The invention is of course not restricted to the foregoing example which merely represents a particularly effective insulating finishing cement. We have found that the relative proportions of ingredients may be varied over a wide range to form an insulating finishing cement according to our invention with a resultant gradual change in properties of the cement produced. However, we have found the most desirable range of the essential constituents to be 32-49% mineral fibers, 40-51% cementitious ingredients comprising Portland cement and fly ash, and 9-20% binder comprising pregelatinized starch and bentonite. The weight percentages of these ingredients should total 100% but it will be apparent that additional ingredients such as gypsum and plasticizers may also be included without changing the amounts of the principal ingredients thus selected. The above percentages are by weight and are calculated as percentages of the total fiber-cement-binder content only. The proportion of starch and bentonite in the binder portion should be in the range of 37-62% starch, balance bentonite. In the cementitious portion we may combine the Portland cement and fly ash in proportions containing 20% fly ash, balance Portland cement, with satisfactory results but we have strangely found that the addition of further fly ash improves the composition by reducing its density and increasing its thermal insulating value and its plasticity. For no apparent reason the proportion of fly ash in the cementitious component may be carried to as high as 80% with very good results. We particularly prefer a cementitious component which contains 40-80% fly ash with the balance Portland cement.

The amount of water required to form a plastic mass of suitably workable consistency with compositions in the foregoing ranges varies with the specific composition used, but it will generally be found that from 1.5 to 2.0 parts by weight of water per part by weight of dry mix is required to form a workable mass.

Despite the low densities of the compositions of this invention their surfaces are smooth and relatively hard. While we do not know the exact reason for this phenomenon, the surface hardening appears to be caused by a slight but controlled migration of denser particles to the surfaces of the material. The migration tends to contribute autogenous sealing at the surface facilitating painting or whitewashing directly on the cement without requiring sizing.

While starch alone has been found to decompose at temperatures below 1000° F., its combination with bentonite in the present invention protects the starch and prevents its decomposition at temperatures up to 1000° F., thus broadening the application of our insulating finishing cements to the high temperature fields. For example, we have applied our novel cements to the casings of high pressure turbines containing superheated steam at a temperature above 950° F. with marked success and without detecting any cement breakdown whatever. In such high temperature work it is often desired to provide a very thick cement covering for especially economical insulation. We have found that our novel cements are readily applied in layers about 1½ inches thick in such cases and that a second layer and further successive layers may be applied directly to a prior hardened layer. Even when the hardened layer is not scratched or roughened the second layer attaches to it with tenacious adhesion. This presents a distinct advantage over prior art insulating cements which do not have this unusual property of marked self-adhesion.

Our novel insulating finishing cements are applicable to smaller installations such as one-inch pipes but the cost of labor in applying the plastic mixture by hand may be found to be high in certain instances. We have accordingly found that a satisfactory method for covering small pipes comprises forming the cement into prefabricated shapes in molds, care being taken to wax the molds to prevent the cement from sticking to the surface of the mold. In molded form the product is easily applied and is an excellent insulator while it has a smooth outer surface normally obtainable only by the use of finishing cements having poor insulating qualities.

So far as we are aware the present invention provides the first commercially practical insulating finishing cement and should not be confused with prior art insulating or finishing cements which may have insulating or finishing characteristics but which do not combine insulating and finishing properties in a single composition having the other characteristics required for a practical insulating finishing cement.

Having thus described our invention, we claim:

1. An insulating finishing cement dry mix containing by weight, 32-49% mineral fibers, 40-51% cementitious ingredients comprising 40-80% fly ash and the balance Portland cement, and 9-20% binder comprising 37-62% pregelatinized starch and the balance bentonite.

2. An insulating finishing cement dry mix containing the following ingredients in substantially the following proportions by weight:

| | Weight per cent |
|---|---|
| Fly ash | 28 |
| Portland cement | 14 |
| Gypsum | 4 |
| Tufted rock wool | 35 |
| Bentonite | 8½ |
| Pregelatinized starch | 7½ |
| Trisodium phosphate | 2 |
| Sulphate of lauryl alcohol | 1 |

3. A surface having a highly adherent relatively hard-surfaced thermally-insulating coating containing by weight 32-49% mineral fibers, 40-51% cementitious component comprising 40-80% fly ash and the balance Portland cement, and 9-20% binder component comprising 37-62% pregelatinized starch and the balance bentonite.

MERWYN C. RANDALL.
GEORGE S. GETHEN.

REFERENCES CITED

The following references are of record in the file of this patent:

UNITED STATES PATENTS

| Number | Name | Date |
|---|---|---|
| 1,770,767 | Collings | July 15, 1930 |
| 2,060,295 | Finefrock | Nov. 10, 1936 |
| 2,083,961 | New | June 15, 1937 |

FOREIGN PATENTS

| Number | Country | Date |
|---|---|---|
| 100,703 | Australia | 1937 |